United States Patent
Gerdes et al.

(10) Patent No.: US 9,674,273 B2
(45) Date of Patent: *Jun. 6, 2017

(54) METHOD FOR PROVIDING COMPOSED SERVICES IN A PEER-TO-PEER NETWORK

(71) Applicant: Unify GmbH & Co. KG, Munich (DE)

(72) Inventors: Christoph Gerdes, Munich (DE); Vivian Prinz, Munich (DE); Alan Southall, Walldorf (DE)

(73) Assignee: Unify GmbH & Co. KG, Munich (DE)

( * ) Notice: Subject to any disclaimer, the term of this patent is extended or adjusted under 35 U.S.C. 154(b) by 394 days.

This patent is subject to a terminal disclaimer.

(21) Appl. No.: 14/453,744

(22) Filed: Aug. 7, 2014

(65) Prior Publication Data

US 2014/0351313 A1    Nov. 27, 2014

Related U.S. Application Data

(63) Continuation of application No. 12/309,560, filed as application No. PCT/EP2007/057615 on Jul. 24, 2007, now Pat. No. 8,838,682.

(30) Foreign Application Priority Data

Jul. 25, 2006 (EP) .................................... 06015487
Sep. 6, 2006 (DE) .......................... 10 2006 041 868

(51) Int. Cl.
  *G06F 15/16* (2006.01)
  *H04L 29/08* (2006.01)
  *G06Q 10/10* (2012.01)

(52) U.S. Cl.
  CPC ............. *H04L 67/10* (2013.01); *G06Q 10/10* (2013.01); *H04L 67/104* (2013.01);
  (Continued)

(58) Field of Classification Search
  None
  See application file for complete search history.

(56) References Cited

U.S. PATENT DOCUMENTS

2002/0156875 A1    10/2002   Pabla
2003/0120708 A1    6/2003    Pulsipher et al.
(Continued)

FOREIGN PATENT DOCUMENTS

EP      1431875 A1      6/2004

OTHER PUBLICATIONS

Ankolekar A. et al.: "DAML-S: Web Service description for the Semantic Web" Lecture Notes in Computer Science, Springer Verlag, Berlin, Germany, vol. 2342, Jun. 9, 2002, pp. 348-363, XP002276131 ISSN: 0302-9743.

*Primary Examiner* — Jeffrey R Swearingen
(74) *Attorney, Agent, or Firm* — Buchanan Ingersoll & Rooney PC

(57) ABSTRACT

A method for providing a service containing facilities in a peer-to-peer network comprising peer devices is provided. The peer devices may be associated with groups, each group being defined by a pre-determined facility. The pre-determined facility may be executed by each peer device associated with a respective group, and a selected peer device of a group executes the respective facility. A sequence of facilities and specifications to be executed is publicized in the peer-to-peer network, on the peer devices executing the respective facility by a peer device requesting the combined service, and the selection of the selected peer devices is carried out according to the publicized sequence and the publicized specifications.

20 Claims, 6 Drawing Sheets

(52) U.S. Cl.
CPC .......... *H04L 67/1059* (2013.01); *H04L 67/16* (2013.01); *H04L 67/1072* (2013.01)

(56) References Cited

U.S. PATENT DOCUMENTS

| | | | |
|---|---|---|---|
| 2004/0098447 A1* | 5/2004 | Verbeke | G06F 9/5055 709/201 |
| 2004/0128013 A1 | 7/2004 | Blawat et al. | |
| 2004/0148326 A1 | 7/2004 | Nadgir et al. | |
| 2006/0080389 A1* | 4/2006 | Powers | G06F 9/5072 709/203 |
| 2007/0086435 A1 | 4/2007 | Kaler | |

\* cited by examiner

METHOD FOR PROVIDING COMPOSED SERVICES IN A PEER-TO-PEER NETWORK

CROSS REFERENCE TO RELATED APPLICATIONS

This application is a continuation application of U.S. patent application Ser. No. 12/309,560, which is the U.S. National Stage of International Application No. PCT/EP2007/057615, filed Jul. 24, 2007, which claims the benefits of European application No. 06015487.9 EP filed Jul. 25, 2006 and German application No. 10 2006 041 868.9 DE filed Sep. 6, 2006. European application No. 06015487.9 EP and German application No. 10 2006 041 868.9 DE are incorporated by reference herein in their entirety.

FIELD OF INVENTION

The present invention relates to a method for providing a service composed of subtasks in a peer-to-peer network comprising peer devices.

BACKGROUND OF INVENTION

By means of peer-to-peer systems, it is possible to network a multiplicity of devices, referred to hereinbelow as peer devices, to one another. Communication between the peer devices takes place via the protocol of a communications network, for example the internet. The peer devices participating in the peer-to-peer network can offer defined services such as e.g. the automatic translation of a text. It is possible by means of peer-to-peer networks to enable network-wide resource or service sharing without having to use central infrastructures such as central server devices.

Since the peer devices in peer-to-peer networks of this type generally offer very specialized services, a composition of subtasks is required in order to implement complex services. This can be achieved for example through the chaining of simple subtasks. It is conceivable, for example, for a textchat application which is accessed from a PDA (personal digital assistant) to be diverted to a speech output. This may be necessary, for example, if the user of the PDA is driving a motor vehicle on the road. It is also conceivable for an automatic translation service to be connected upstream of the speech output in order firstly to translate the textchat into the mother tongue of the user. The chaining of the subtasks textchat, automatic translation and text-to-speech output realizes in this way a dynamically composed service, it being possible for the subtasks to be executed by different peer devices in the network.

SUMMARY OF INVENTION

Since, however, as a result of the failure of individual peers and the joining of new peer devices, a peer-to-peer network constitutes a dynamic system, the provision of such composed services by drawing on the offered services of the individual peers may be problematic. Here, a fully decentralized management of the composition of a complex service from subtasks is required, with allowance also being made for the continuous logging on and logging off of individual peer devices to/from the peer-to-peer network.

In the event of failure of a peer executing a subtask in the respective complex service composition, it is desirable for the complex service to continue to be able to be offered and for the failed subtask to be taken over by another peer.

It is also desirable for any computing power needed for execution of the complex composed service to be divided advantageously between the peer devices offering the subtasks without central performance information of the individual peer devices having to be accessed. A particular problem consequently consists in advantageously making the selection of the peer devices for a predetermined subtask. It must also be possible for the respective service composed of subtasks to be established and provided rapidly even in large peer-to-peer networks.

In the past, approaches have been pursued, for example, in which firstly all the possible service paths, i.e. the chaining of subtasks which are executed by different peer devices, are identified and evaluated in terms of their performance capability by a peer requesting a complex composed service. The best service path, i.e. the most efficient chaining of the subtasks executed on a respective peer to the overall composed service, is then selected.

This approach is very costly as a result of the high number of possible peer devices offering services and requires a long initialization period before actual processing and provision of the composed service can take place. Deterministic algorithms for locating the optimum service path need an exponentially large amount of time based on the number of peer devices present in the peer-to-peer network.

An object of the present invention is therefore to create a method for providing a service composed of subtasks in a peer-to-peer network comprising peer devices, which method enables rapid initialization and reliable execution of the composed service.

This object is achieved in a method for providing a service composed of subtasks according to the independent claims.

According to this, a method is provided for providing a service composed of subtasks in a peer-to-peer network comprising peer devices, the peer devices being respectively assignable to groups. Each group is defined by a predetermined subtask, and the predetermined subtask can be executed by each peer device assigned to a respective group. A selected peer device of a group executes the respective subtask. A sequence of subtasks to be executed and specifications to the peer devices executing the respective subtask is published in the peer-to-peer network by a peer device requesting the composed service. The selection of the selected peer devices is made as a function of the published sequence and the published specifications.

Publishing is understood here to mean the distributed storage of information in the underlying peer-to-peer network. It is also assumed that the underlying peer-to-peer network permits the distributed storage and retrieval of information and that a corresponding communication protocol is in place for the peer devices which form the peer-to-peer network. The stored information is also referred to generally as resources and distributed storage as the publication of resources.

According to the invention, not all the possible service paths or chainings of peer devices and of the subtasks executed by the peer devices have to be looked at. Rather, all the peer devices available are assigned to logic groups which are characterized by the respective subtask. The result is a linear composition of services from subtasks by the service groups. The term Service group here refers to the number of peer devices which are capable in principle of executing a predetermined subtask. In organizational terms, to initialize and execute the composed service, only a chaining of the groups has to be implemented, which is considerably less costly and can be carried out in a faster time.

To form a respective group, the following method steps are preferably implemented:

publication of a CandidateResource by the peer devices, the CandidateResource comprising information about the subtasks which can be executed by the respective publishing peer device and the performance capability of the respective publishing peer device;

publication of a SubtaskResource which comprises information about at least one of the subtasks to be executed and the associated specifications; and selection of the executing peer device from the group of peer devices, by means of which a predetermined subtask can be executed, as a function of the performance capability and the published specifications for the [lacuna] the respective subtask.

The distributed storage of the CandidateResource, which comprises for example a list of those subtasks which can be executed by the publishing peer makes it possible for all the peer devices to be sorted into logic groups. A respective logic group is defined by the function of a subtask. A corresponding group or service group then comprises all the peer devices which can execute a subtask concerned.

The published CandidateResources also contain data about the respective performance capability of the publishing peer device such as e.g. a bandwidth, existing storage space or CPU output.

Publication of the SubtaskResource then reveals the group membership of the peer devices and also makes it possible for the peer devices of a group to be sorted in terms of their performance capability. The most powerful peer device of a group can be selected to actually execute the subtask. The specifications, published with the SubtaskResource, to the peer devices executing the respective subtask are specified e.g. in a comparator class. The comparator class contains comparison rules which are taken into account in the selection of the executing peer device. If, for example, a particularly high bandwidth is needed for a subtask, the bandwidth is specified in the comparator class as a comparison rule among the peers assigned to the group, If several peer devices then exhibit this bandwidth, in a further specification by another subordinate comparator class, relating for example to the CPU output, can be used.

Preferably, at least one watchdog peer device is defined from a respective group of peer devices, the watchdog peer device monitoring a function or functionality of the peer device selected and executing the respective subtask. This can be achieved e.g. through the exchange of so-called heartbeat messages, which are sent from the executing peer to the watchdog peer devices. In this way, the watchdog peers of a group can assess whether the executing peer is providing subtask results reliably and whether its functionality is unimpaired. If the peer which is initially executing fails, one of the watchdog peer devices takes over the execution of the subtask.

A ServiceGroupResource is preferably published for a respective group, comprising information about the current selected peer device executing the subtask and/or the defined watchdog peer devices. This ServiceGroupResource, referred to as a state resource, regularly stores the state, for example intermediate results, of subtask execution, and the structure of the group. This means that the ServiceGroupResource always contains up-to-date information about the respective executing peer and the monitoring watchdog peer devices. If, for example, the initially executing peer device fails, the best-assessed, i.e. next most powerful, watchdog peer reads out the ServiceGroupResource for executing the subtask concerned and takes over execution of the subtask using, for example, the intermediate results from the ServiceGroupResource.

The publication of the SubtaskResource, the selection of the peer device executing the respective subtask and/or the definition of the watchdog peer devices is/are preferably carried out by a peer device requesting the respective subtask. The assignment to execute the requested subtask is therefore initially carried out by a peer device designated as the coordinating peer device.

To initialize the composed service, the following method steps are preferably carried out:

publication of a ComposedServiceResource, comprising the sequence of the subtasks used for executing the composed service, in particular criteria for the selection of the executing peer devices, chaining of the subtasks and execution parameters for the subtasks;

publication of a SubtaskResource for the requesting of the subtask to be executed last in the sequence of subtasks by the peer device requesting the composed service, identification of the peer device requesting the composed service being written by the requested subtask to the SubtaskResource as a handover peer device for a subtask result, and selection of the peer device from the group which has to execute the requested subtask; and publication of further SubtaskResources for requesting the subtask respectively to be executed precedingly in the sequence of subtasks by the selected peer device which executes the subtask respectively to be executed subsequently in the sequence of subtasks, identification of the peer device requesting the subtask being written by the requested subtask to the SubtaskResource as a handover peer device for a subtask result, and selection of the peer device from the group which has to execute the requested subtask.

After the individual service groups, i.e. execution of the subtasks by the group assignment, is reliably in place, a linking or chaining of the subtasks to one another takes place through the sequential publication of SubtaskResources. The availability of a composed service in the peer-to-peer network is published in the form of the ComposedServiceResource.

If a composed service is needed by a requesting peer device, the latter reads the ComposedServiceResource. For example, all the subtasks of the composed service as well as associated parameters, such as power resources needed or quality-of-service parameters, are stored in the ComposedServiceResource. The peer device requesting the composed service can also itself also publish a ComposedServiceResource, in which all the subtasks and parameters needed are specified.

The peer device requesting the composed service first publishes the SubtaskResource for the subtask to be executed last in the service chain. The subtask result of this service which is to be executed last is handed over to the requesting peer in the execution of the entire composed service. This peer requesting the composed service also coordinates the group structure of the group of peer devices defined by the subtask to be executed in advance. The executing peer device thus defined then publishes a SubtaskResource for the subtask respectively to be executed in advance.

This chaining of subtasks or of groups defined by the subtasks is carried out until the subtask to be executed initially in the service chain has been provided in accordance with its SubtaskResource. In this way, through initialization, all the peer devices executing the subtasks are selected and corresponding ServiceGroupResources comprising information about group structure are known.

Information written to the SubtaskResources can preferably be information about the requirements for the respective subtasks, the chaining of subtasks and, in particular, identifiers of ComposedServiceResources. An identifier enables direct access to the corresponding resource. It is particularly advantageous for the identifier of the ComposedServiceResource to be stored for the respective subsequent subtask of an existing SubtaskResource. It is also conceivable for the information filed in the ComposedServiceResource about the chaining of subtasks to be passed on via the publication of SubtaskResources to all the executing peer devices for the subtasks.

After selection of the peer device which has to execute the first subtask in the sequence of subtasks, an initialization message is preferably sent to the peer device requesting the composed service. In this way, the first peer device, i.e. the peer device requesting the composed service, recognizes that a chaining of all the subtasks has been carried out successfully. The state of the subtasks forming the composed service and/or also intermediate results of these subtasks can be published by the peer device requesting the composed service by means of a ComposedServiceStateResource.

After the selection of all the peer devices executing the respective subtasks, a ring message is preferably sent by the peer device requesting the composed service to the selected peer device executing the subtask which is to be executed first in the sequence, which then forwards the ring message to the peer devices executing the subsequent subtasks in the sequence, whereupon these send this message back to the peer device requesting the composed service. The peer devices forming the composed service by virtue of their subtask execution are instantiated by this means.

The ring message is preferably sent at regular intervals to monitor execution of the composed service, in order to check, for example, the reliable execution and availability of all the subtasks. A corresponding result can be updated e.g. in the ComposedServiceStateResource.

When transmitting the ring message, a respective executing peer device determines the identification of the peer device which will execute the subsequent subtask in the sequence, preferably by reading out the ServiceGroupResource of the respective group defined by the subsequent subtask. Since the group structure is filed in the respective ServiceGroupResource, an identification or address of the respective executing peer device can also be obtained from a readout.

In a variant of the method, optional subtasks, which can be skipped during execution of the chained subtasks, are marked in the ComposedServiceResource. It is for example conceivable for all the peer devices of a group defined by a subtask to fail and for the chain of subtasks to be interrupted. If a subtask of this type is marked as optional, this subtask can be skipped during execution.

A marked optional subtask in the sequence of subtasks to be executed is skipped if all the peer devices of the group defined by the optional subtask fail. The executing peer device which executes the subtask preceding the subtask to be skipped in the sequence transmits its subtask result to the peer device which executes the subtask succeeding the subtask to be skipped in the sequence. It is possible here for an executing peer device, upon failure of the subtask following it, to read the respective ComposedServiceResource and to read an identification of the ServiceGroupResource for the group which is defined by the next-but-one subtask in the sequence. In this way, an executing peer device whose subtask result cannot be sent to the optionally provided peer device executing the subtask because the latter has failed recognizes that its subtask result has to be transmitted to the next-but-one peer device in the service chain.

Advantageously, a respective executing peer device is automatically notified in the event of a change to the ServiceGroupResource for the group defined by the succeeding subtask in the sequence. The automatic notification is also referred to as a PublishSubscribe mechanism. The Subscribe mechanism enables individual peer devices to subscribe to published resources. Where a corresponding subscription has taken place, the subscribing peer devices are always notified when a resource is published or changes have been made to the resource. This ensures that the up-to-date group structures are always known.

It is also conceivable for at least one peer device to be assignable to several groups and as an executing peer device to execute various subtasks. The inventive monitoring of peer devices by watchdog peers makes it possible for one peer device which participates in several groups or in the execution of several subtasks to be reliably monitored. It is, for example, conceivable for one peer device to execute various subtasks in turn.

The invention also relates to a computer program product which arranges the execution of a corresponding method for providing a service composed of subtasks in a peer-to-peer network on one or more program-controlled peer devices.

Further advantageous embodiments of the invention form the subject matter of the subclaims as well as the exemplary embodiments described below.

BRIEF DESCRIPTION OF THE DRAWINGS

The invention is now explained in more detail with the aid of individual exemplary embodiments and with reference to the figures, in which.

DETAILED DESCRIPTION OF INVENTION

Figure 1:
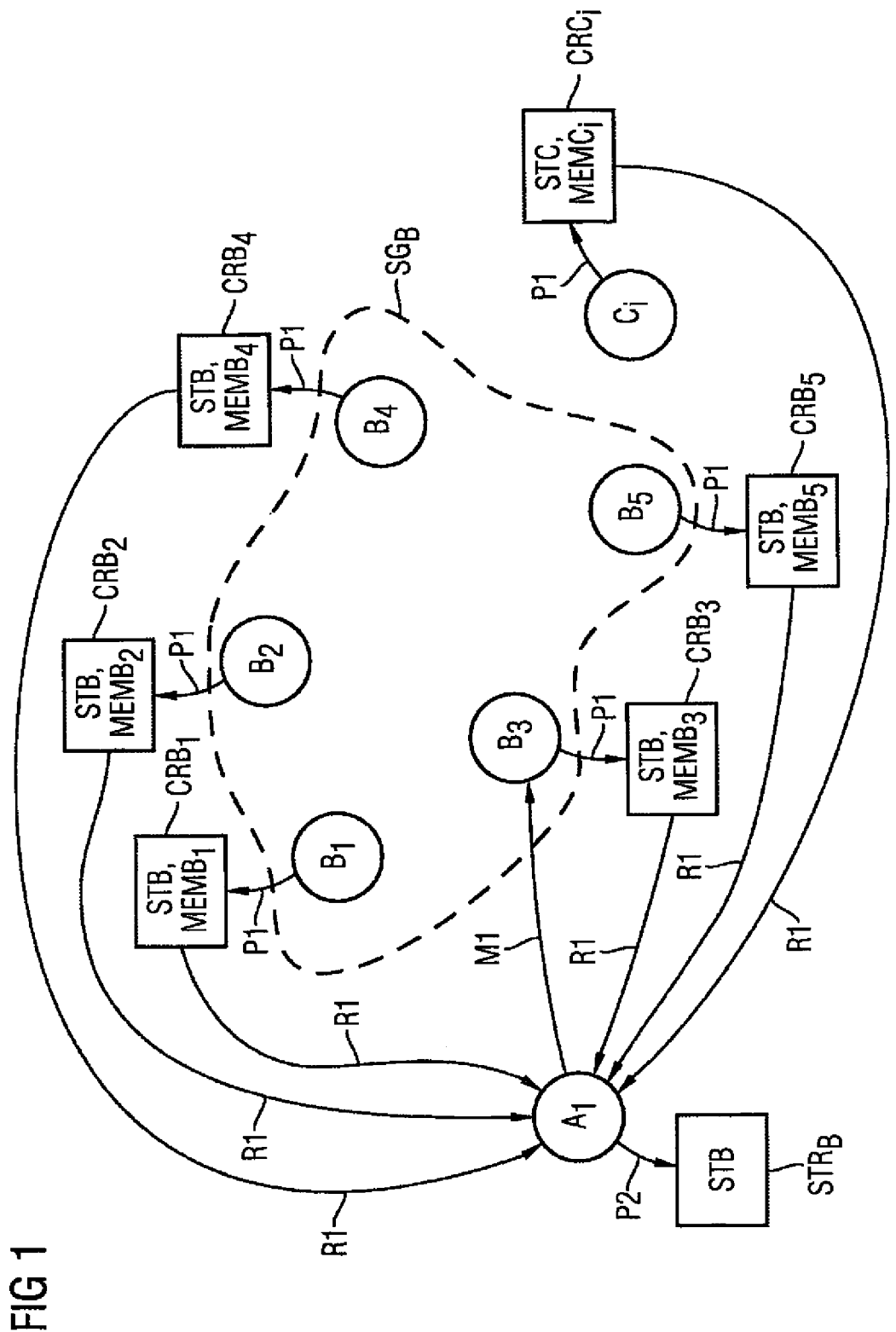
FIG. 1 shows a graphic representation of the formation of service groups.

Elements which are the same or have the same function have been labeled with the same reference characters in all the figures, unless specified otherwise.

FIG. 1 shows a graphic representation of the publication and assignment processes necessary for forming groups in a peer-to-peer network. A selection of peer devices $A_1$, $B_1$-$B_5$, $C_i$ in a peer-to-peer network is represented in FIG. 1. The peer devices may for example be computers offering services in a communications network such as the Internet. The peer-to-peer network protocol provides communication between the peer devices and permits the distributed storage of data or information in the peer-to-peer network. The distributed storage of information, which is also referred to as a resource, is called publishing. For peer devices, the terms entities, terminals or peers are also commonly used.

Each peer device $A_1$, $B_1$-$B_5$, $C_i$ is capable of executing a defined-subtask or several subtasks. This may, for example, be the execution of a textchat, the automatic translation of text, speech recognition or a text-to-speech output function. Each peer device $A_1$, $B_1$-$B_5$, $C_i$ in the peer-to-peer network publishes its CandidateResource $CRB_1$-$CRB_5$ $CRC_1$. The publication of the CandidateResource $CRB_1$-$CRB_5$ $CRC_i$ is signaled by means of the arrows P1.

In FIG. 1, it is assumed that the peer devices designated $B_1$-$B_5$ can execute a subtask designated STB. The published CandidateResources $CRB_1$-$CRB_5$ consequently contain information about this. Information is also specified in the CandidateResources $CRB_1$-$CRB_5$ about the performance capability of the peer devices $P_1$-$P_5$ in the execution of the subtasks of the service STB. This may, for example, be the storage space $MEMB_1$-$MEMB_5$ available for executing the subtasks.

Similarly, the peer device $C_i$ publishes its CandidateResource $CAC_i$ which specifies that the peer device $C_i$ is capable of performing a subtask STC. This may, for example, be an automatic text translation. Also listed in the CandidateResource $CRC_i$ of the peer device $C_i$ are further features relating to execution of the subtask STC, such as a bandwidth or a storage space $MEMC_i$.

Based on knowledge of the CandidateResources and knowledge of the readiness of the peer devices present in the peer-to-peer network, there is an affiliation of each peer device to a logic group. The group or service group SGB comprises e.g. all the peer devices present in the peer-to-peer network which are capable of performing the subtask STB. This is indicated in FIG. 1 by the dashed line around the peer devices $P_1$-$P_5$.

FIG. 1 also shows a peer device $A_1$ which needs for its function and would like to request from the peer-to-peer network e.g. the subtask STB. This request by the peer device $A_1$ is effected e.g. by publishing a SubtaskResource $STR_B$. The SubtaskResource $STR_B$ stipulates that the subtask STB is needed and what performance requirements and performance parameters are necessary for executing the subtask. The SubtaskResource STRB contains, in particular, selection rules, comparator classes as they are called, which stipulate the criteria according to which a peer device best suited to executing the subtask is selected. This may, for example, be in an initial preselection stage the largest available storage space and, if several peer devices fulfill this criterion, in a second selection stage the CPU output provided. Based on the SubtaskResource $STR_B$ for the subtask, the best possible peer device can thus be determined for the subtask STB.

The peer device $A_1$ requesting the subtask then reads in a read step R1 the CandidateResources CRB of the peer devices present in the peer-to-peer network. Using the subtask description STB and the comparator classes in the SubtaskResource $STR_B$, this requesting peer device $A_1$ decides, for example, that the peer device $B_3$, will execute the subtask STB as the most powerful peer device of the service group $SG_B$ and notifies this device thereof in a message M1. The requesting peer device $A_1$ or the peer device $B_3$ then defined for executing the subtask STB can define so-called watchdog peer devices which are to monitor the function of the executing peer device $B_3$.

Figure 2:
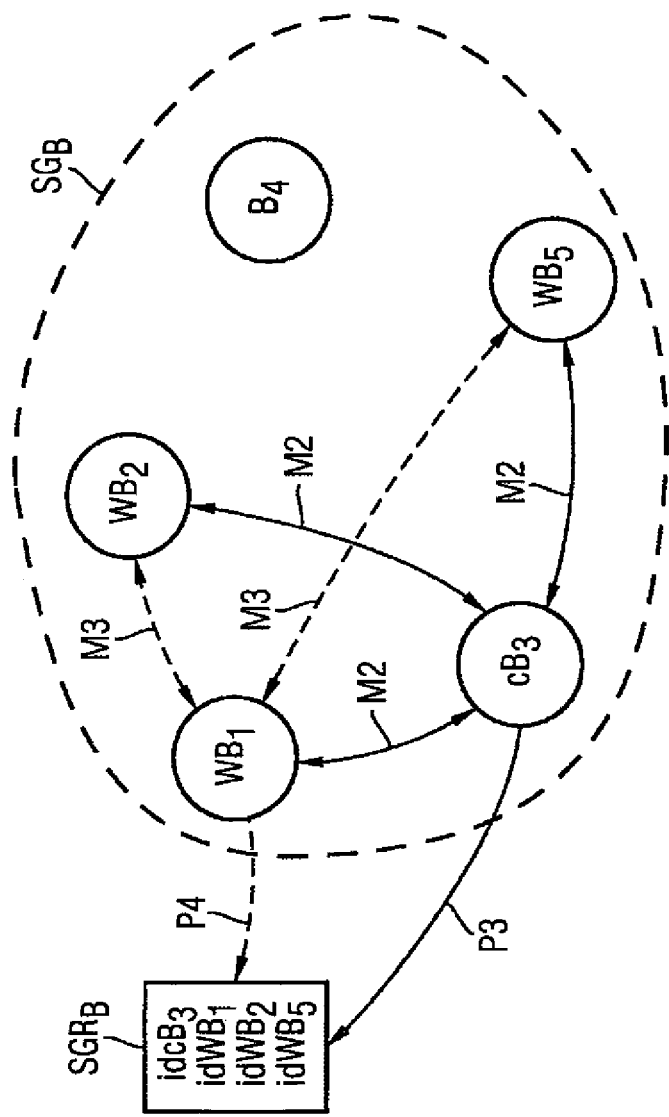
FIG. 2 shows a graphic representation of an example of a groups structure.

FIG. 2 schematically represents a developed group structure. The service group $SG_B$ comprises the peer devices $B_1$-$B_5$ previously shown in FIG. 1. The peer device $B_3$, which was designated the coordinating peer device $CB_3$, was chosen as the peer device to execute the subtask STB, having been classified as the most powerful for doing so.

The next most powerful peer devices $B_1$, $B_2$, $B_5$ for executing the subtask were designated watchdog peer devices $WB_1$, $WB_2$, $WB_5$. The watchdog peer devices $WB_1$, $WB_2$, $WB_5$ receive continuously from the executing or coordinating peer device $cB_3$ messages M2 and in this way monitor the reliable functioning of the currently executing peer $cB_3$. The monitoring messages are referred to as heartbeat messages M2.

The corresponding group structure is documented through publication of a ServiceGroupResource $SGR_B$. The respectively coordinating peer device $cB_3$ initiates the distributed storage and publication P3 of the ServiceGroupResource $SGR_B$. The latter contains e.g. the identifications of the executing peer device $idC_3$ defined for the service or service group $SG_B$ and of the respective watchdog peer devices $idWB_1$, $idWB_2$. The complete structure of the group executing the subtask STB is thus filed in the ServiceGroupResource $SGR_B$.

If the executing peer $cB_3$ now fails, for example as the result of a defect, the second-best watchdog peer device in the ranking of performance capability for executing the subtask, for example $WB_1$, recognizes this from failure of the heartbeat message M2. In this case, the watchdog peer device $WB_1$ takes over the function of coordinating peer device and execution of the subtask STB. The peer device $B_1$, then operating as the coordinating peer device, also transmits corresponding messages to the other watchdog peer devices $WB_2$, $WB_5$ and updates the ServiceGroupResource $SGR_B$ by publishing P4. These measures which are necessary in the event of failure of the current coordinating or executing peer device $cB_3$ are indicated by the dashed arrows.

The group structure containing watchdog peers means that it is possible to guarantee that a subtask will always be executed reliably. Furthermore, the group structure is always stated in an up-to-date manner by the published ServiceGroupResource.

A change to the group structure may also be necessary if, through publication of a CandidateResource, a new peer joins the service group $SG_B$ and this peer has a more favorable performance capability for executing the subtask. The respectively coordinating peer $cB_3$ can subscribe to the CandidateResources of the peer devices assigned to the service group and is in this way informed of the availability of a better peer device. The evaluation of peer devices in terms of their performance capability and with the aid of the comparator classes filed in the SubtaskResource can thus also take place during operation, i.e. during execution of the subtask.

A logic service group according to the invention consequently performs the predetermined subtask in a failsafe manner, and slight consideration has to be given, when selecting the respectively executing peer, to parameters such as the resources, qualities of service or user requirements needed.

Figure 3:
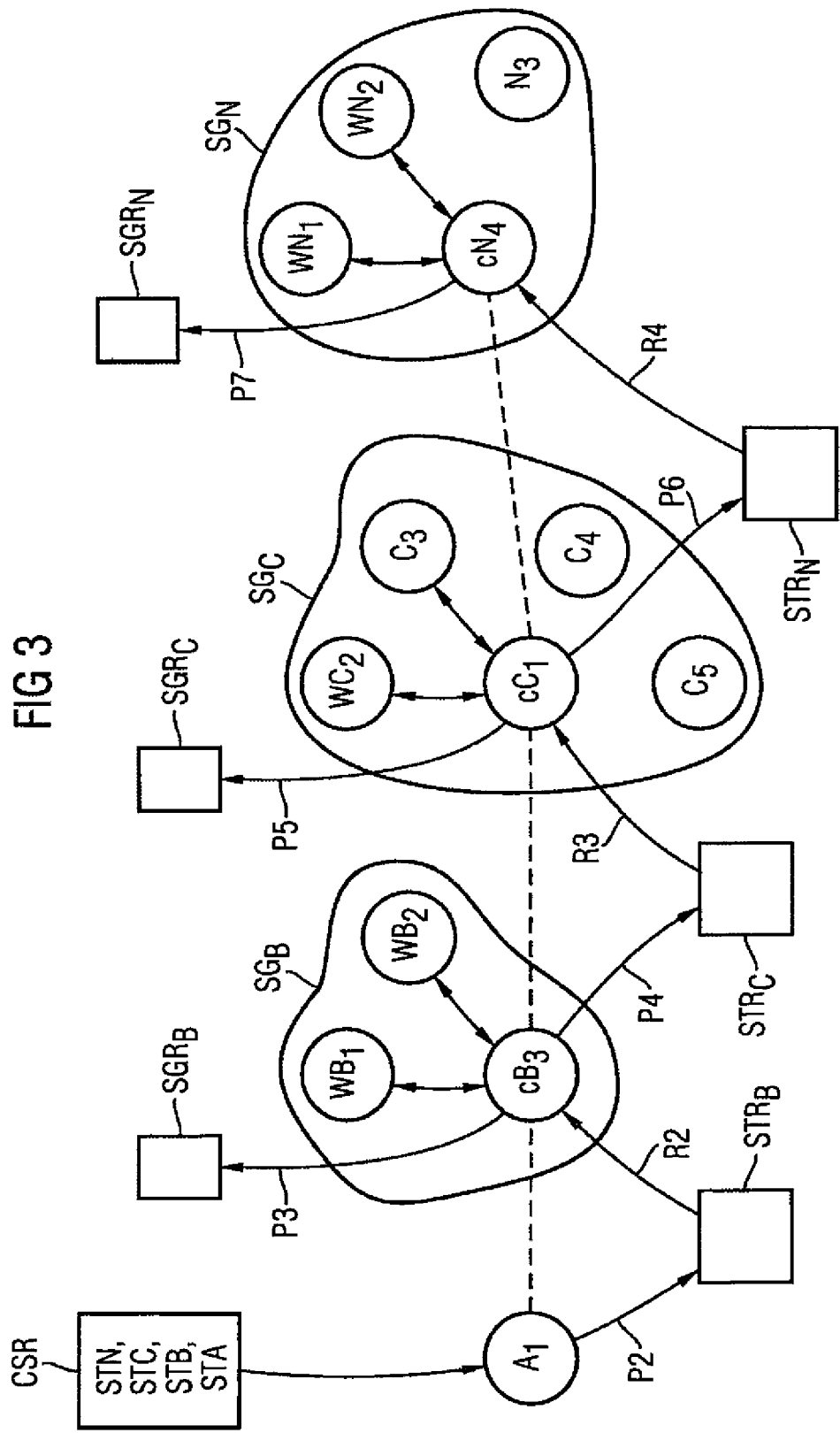
FIG. 3 shows a graphic representation of the chaining of subtasks to form a composed service.

A variant of the method for providing a composed service, based upon the formation of service groups for subtasks to be executed, is represented schematically in FIG. 3. In the example under consideration, it is assumed that a peer device $A_1$ requesting a composed service needs several subtasks which are carried out in succession.

An example of a composed service is a textchat, which is accessed from a PDA. A speech output of the textchat is then needed, for example during a car journey. To this extent, the subtasks which have to be chained to one another are the textchat application, an e.g. optional automatic translation, and finally the speech output of the translated text. In the example under consideration, STA designates the PDA application, the STB subtask the conversion of text into speech, the STC subtask the translation of a source language into a target language and the STN subtask the textchat application.

Initiation of the composed service in the peer-to-peer network is effected firstly through the reading of a ComposedServiceResource CSR which lists the necessary subtasks for the composed service and defines additional quality-of-service parameters and the chaining of the subtasks to one another. For example, an XML representation for a possible ComposedServiceResource is given below:

```
<composedServiceResource>
   <descriptor>advanced textchat</descriptor>
   <numberOfSubtasks>3</numberOfSubtasks>
   ...
   <subtask>
      <name>text-to-speech</name>
      <comparator>Maximum/CpuComparator</comparator>
      <participation>mandatory</participation>
      ...
   </subtask>
   <subtask>
      <name>translation</name>
      <comparator>MaximumMemoryComparator</comparator>
      <participation>optional</participation>
      ...
   </subtask>
   <subtask>
      <name>textchat</name>
      <comparator>BestConnectionComparator</comparator>
      <participation>mandatory</participation>
      ...
   </subtask>
   ...
</composedServiceResource>.
```

In the ComposedServiceResource CSR, the various subtasks are designated "advanced textchat" STA, "text-to-speech" STB, "translation" STC and "textchat" STN. Also specified are the comparator classes or selection rules for the respectively executing peer devices of the service groups in terms of CPU performance capability (maximum CPU comparator), storage space (maximum memory comparator) and bandwidth (best connection comparator). In addition, the subtasks are specified as optional subtasks, here the translation subtask STC and mandatory subtasks, here the text-to-speech output STB and the textchat itself STN.

The peer device $A_1$ requesting the composed service reads this ComposedServiceResource and then publishes the SubtaskResource $STR_B$ necessary for the subtask to be executed in advance in accordance with the sequence of subtasks specified in the ComposedServiceResource. As previously described with regard to FIGS. 1 and 2, the requesting peer device $A_1$ firstly coordinates the group formation $SG_B$, by virtue of which the peer device $B_3$ is defined as the coordinating and as the executing peer device $cB_3$ and the two peer devices $B_1$, $B_2$ are deployed as watchdog peer devices $WB_1$, $WB_2$.

The published SubtaskResource $STR_B$ contains, for example, all the subtasks STN, STC, STB, STA of the composed service as well as the comparator classes. Also filed is in each case the identifier of the ServiceGroupResources already published, in this particular case the ServiceGroupResource of the peer device $A_1$. The peer device $cB_3$ executing the subtask STB publishes, once group coordination has been completed successfully, its corresponding ServiceGroupResource $SGR_B$ of its group structure.

Since the subtask to be executed in advance in the sequence of subtasks is known to the coordinating peer device $cB3$ from the SubtaskResource $STR_B$, the peer device $cB_3$ takes over the initial coordination for the service group $SG_C$. It consequently publishes a corresponding SubtaskResource $STR_C$ in step P4 and defines with the aid of the comparator classes or comparison criteria specified in the SubtaskResource $STR_C$ the peer device $C_1$ for best possible execution of the subtask STC. The best peer device C1 from the service group SGC is designated the executing peer device $cC_1$. Also, one or more watchdog peer devices $WC_2$ are defined in turn, and the coordinating peer device $cC_1$ reads the SubtaskResource in step R3 and then publishes the group structure in step P5 as the ServiceGroupResource $SGR_C$ assigned to the service group SGC.

The executing peer device $cC_1$ of the service group $SG_C$ then publishes the SubtaskResource $STR_N$ for the subtask STN to be executed in advance in step P4. The SubtaskResource $STR_N$ for executing and forming the service group $SG_N$ defined by the subtask STN now contains the identifications of all the ServiceGroupResources $SGR_B$ and $SGR_C$, as well as the corresponding parameters for structuring the service group $SG_N$.

In turn, the executing peer device of the subsequent group, i.e. the peer device $cC_1$, takes over the initial coordination of the group $SG_N$. The latter defines the peer device $N_4$ as the executing peer device and the peer devices $N_1$, $N_2$ as watchdog peers $WN_1$, $WN_2$. The executing peer device $cN_4$ reads out in step R4 the SubtaskResource $STR_N$ and publishes after the decision about the watchdog peers in step P7 a corresponding ServiceGroupResource $SGR_N$.

The last service group SGN formed, or its coordinating peer device cN4, which executes the subtask STN, now recognizes that all the subtasks and executing peer devices cB3, cC1 and cN4 necessary for the composed service have been defined. The chaining of the subtasks to one another and the chaining of the peer devices executing the subtasks is represented by the dashed line.

A particular advantage of this inventive method for establishing the chained composed service from subtasks STA, STB, STC, STN is that the initial coordinator functionality for forming service groups is distributed between several peer devices. The requesting peer device $A_1$ takes over the initial coordination for the last service group $SG_B$. The then executing peer device $cB_3$ of the last service group takes over the initial coordination of the respective predecessor group $SG_C$ etc. It is not a problem here if the respective coordinator, the executing peer of the subsequent group, fails, as the watchdog peers which are held redundantly available ensure continued functionality and the execution of the subtask.

As soon as the last-selected executing peer $cN_4$ has been defined, which executes the subtask STN to be executed first in the sequence, this peer sends an initialization message INIT to the peer $A_1$ requesting the composed service.

Figure 4:
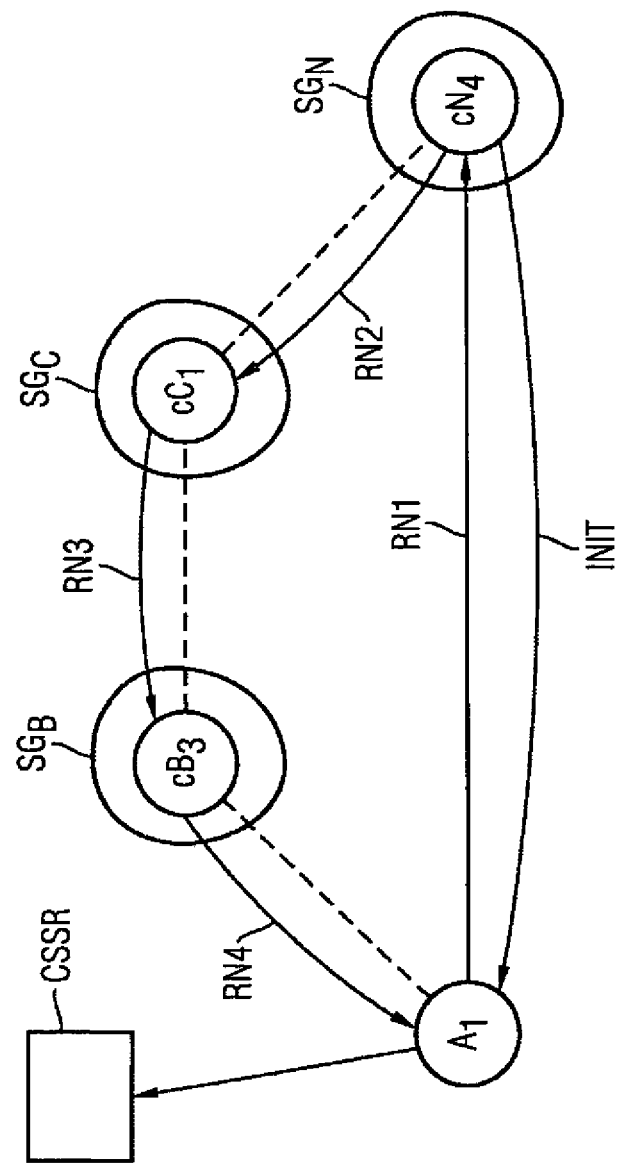
FIG. 4 shows the monitoring of a composed service by means of ring messages.

This is shown in FIG. 4. The peer $A_1$ requesting the composed service receives the initialization message INIT from the peer cN4. Thereupon, a ring message RN1, RN2, RN3, RN4 is dispatched. A first component of the ring message RN1 is sent from the peer device $A_1$ requesting the composed service to the peer device $cN_4$, which has to execute the first subtask STN in the order stipulated by the ComposedServiceResource. This peer device $cN_4$ sends a second part of the ring message RN2 to the coordinating or executing peer $cC_1$, which performs the subtask STC that succeeds the subtask STN. The peer device $cC_1$ sends a further part of the ring message $RN_3$ to the peer device $cB_3$, which performs the subtask STB. Finally, the peer device $A_1$ receives the last part of the ring message RN4 from the peer device $cB_3$. The ring message therefore passes in a circuit starting from the requesting peer device $A_1$ through the respective executing peer devices $cN_4$, $cC_1$, $cB_3$ in the order of the sequence of the subtasks to be executed and back to the requesting peer device $A_1$.

In the process, each peer device reads the address of the respective executing peer device of the subsequent subtask from the corresponding ServiceGroupResource. For example, the peer device $cC_1$ reads the ServiceGroupResource $SGR_B$ for the service group $SG_B$. The peer device $cC_1$ has preferably subscribed to the ServiceGroupResource $SGR_B$ so that it is constantly informed about changes. This also ensures that if an executing peer in one of the service groups $SG_N$, $SG_C$, $SG_B$ fails, a newly executing peer with a new address is available. The parts of the ring message RN1, RN2, RN3, RN4 start the instantiation of the composed service.

To monitor execution of the composed service, the ring message RN1, RN2, RN3, RN4 is regularly dispatched along the executing peer devices. If a connection between peers of different service groups is interrupted or else if an entire service group has failed, this is detected. The requesting peer device $A_1$ publishes in this case a ComposedServiceStateResource in which the operating state and, for example, intermediate results, are filed.

If a subtask fails completely, i.e. all the peer devices belonging to the group fail, the composed service cannot generally be maintained and has to be aborted. This is then documented in the ComposedServiceStateResource by the requesting peer device $A_1$. It is, however, possible for certain subtasks to be coded or marked as optional. This is the case in the example of the XML form of a ComposedServiceResource for the translation service STC shown above.

Figure 5:
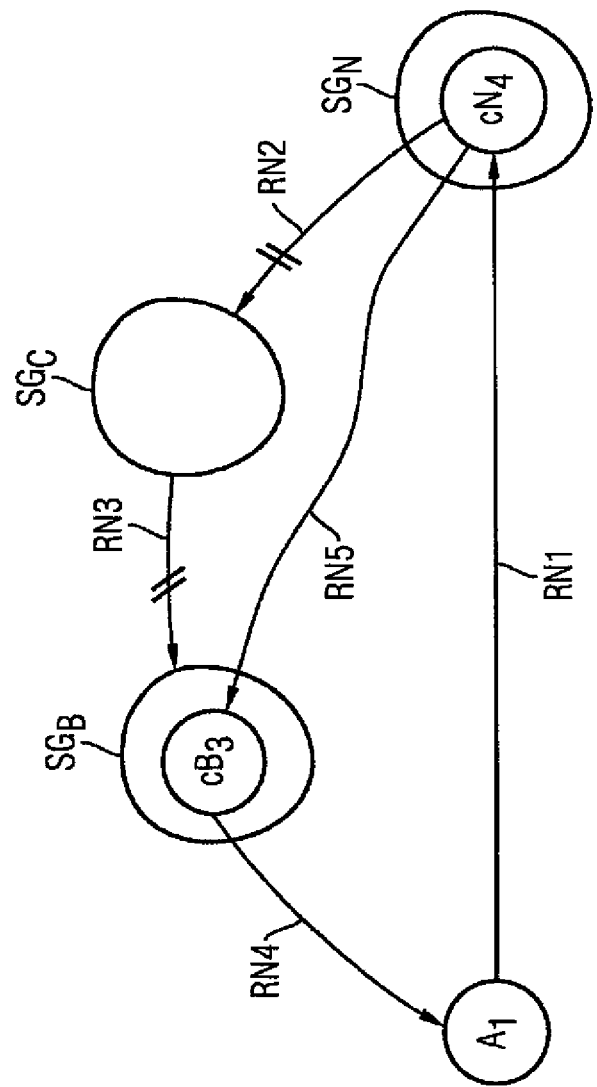
FIG. 5 shows the execution of a composed service in the case of failure of an optional subtask.

FIG. 5 represents schematically a corresponding failure situation. No more peer devices are available in the peer-to-peer network which can execute the translation subtask STC. The service group $SG_C$ consequently has no more members. When the ring message is sent, the partial messages RN2 and RN3 are consequently missing. As the peer device $cN_4$ has subscribed to the ServiceGroupResource SGRC, the peer device $cN_4$ recognizes that the group is failing, since e.g. over an expiration interval no further updating has occurred. Also, the peer device cN4 has knowledge, via its SubtaskResource $STR_N$, of the optionality of the subtask STC.

Since the identification of the other ServiceGroupResources, in particular of the ServiceGroupResource $SGR_B$ for the service group SGD, is also available in the SubtaskResource $STR_N$, the peer device $cN_4$ can send a changed ring message RN5 directly to the peer device $cB_3$ so that a rudimentary composed service without the automatic translation is still possible. The optional character of the subtask STC is passed on during the step-by-step group initiation process by the SubtaskResources $STR_B$, $STR_C$, $STR_N$. A similar procedure can be followed during the initiation phase if a coordinating peer determines that no published CandidateResources corresponding to the requested subtask are available.

If a last peer device of a group fails, the corresponding ServiceGroupResource is not updated further. The use of expiration intervals is therefore recommended, after which a ServiceGroupResource is no longer consulted and the failure of an entire subtask is diagnosed.

If a service group fails totally, the processing or execution of the subtask is usually not completed. If a peer device of the corresponding service group is available again, i.e. goes online, this peer device attempts, based on the state resource, e.g. the ComposedServiceStateResource CSSR, to resume the processing. The ComposedServiceStateResource is therefore checked, and it is established whether the composed service as a whole is still running. If this is the case, the joining peer device recognizes that its service group is an optional subtask. The composed service would otherwise have had to be terminated. If, however, execution of the composed service has been stopped, the newly joining peer device publishes its state of processing of the subtask by overwriting the ServiceGroupResource to terminated. Otherwise, it resumes execution of the assigned subtask. Then, as the only peer in the service group, it is the coordinator and regularly updates the ServiceGroupResource. The executing peer of the predecessor group which subscribes to the ServiceGroupResource is in this way informed about the resumption of the optional subtask. Updating of the connection is then possible and a renewed insertion of the subtask, for example of the STC service, is possible. In this way, a closed chain is re-established by means of the ring messages RN2 and RN3.

Figure 6:
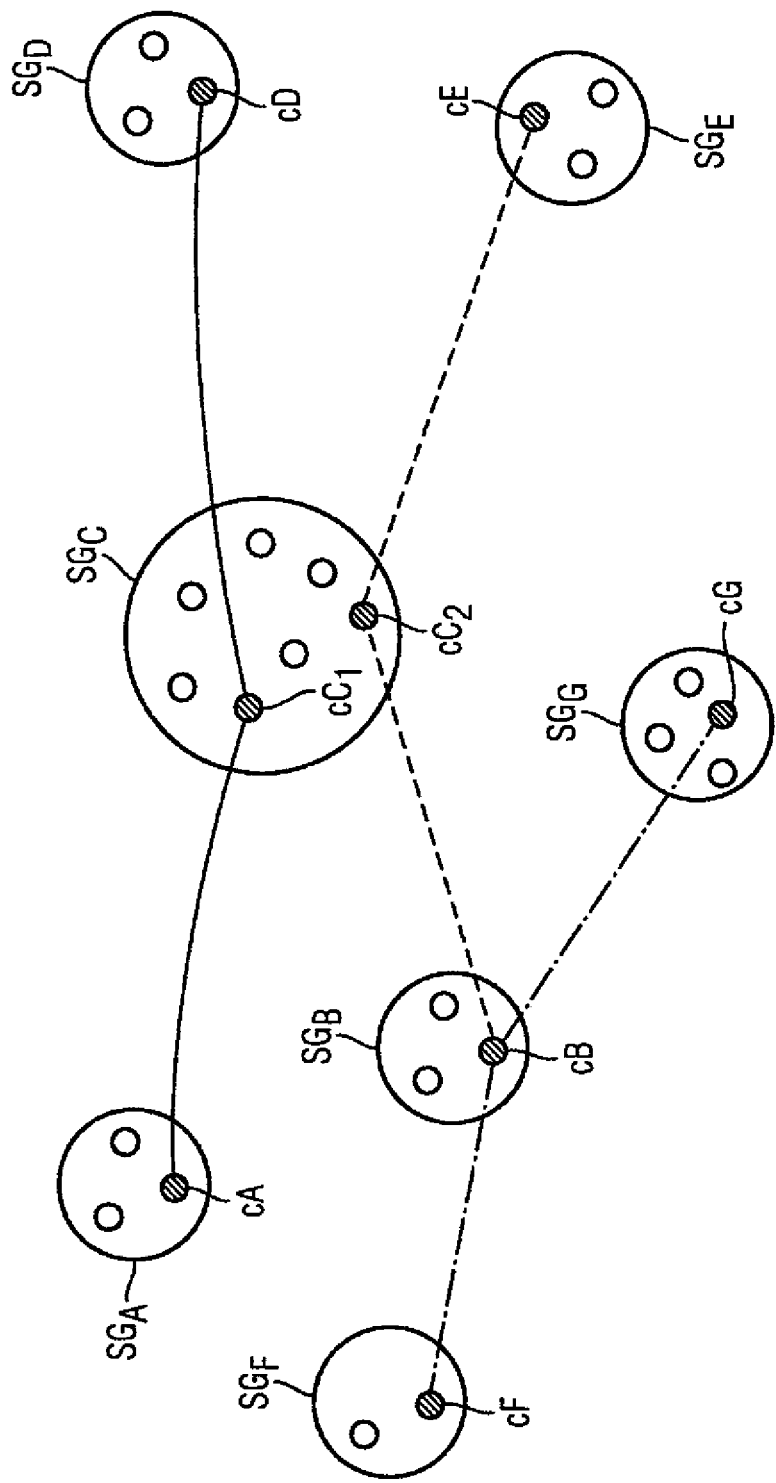
FIG. 6 shows a possible chaining of subtasks where there are several peer devices executing a subtask.

Examples of the parallel use of peer devices as executing peer devices and the participation or execution of subtasks in several composed services are illustrated in FIG. 6.

Several service groups $SG_A$-$SG_G$ are represented, which respectively comprise peer devices which are in principle capable of executing one or more of the subtasks STA-STG. The respective coordinating peer devices or peer devices executing the respective subtask cA-cG, $cC_1$, $cC_2$ are represented by a closed circle.

In addition, three service chainings, i.e. sequences of subtasks to be performed in succession, are indicated by a solid line, a dashed line and a dot-dashed line. A first composed service is provided for example by the subtasks STA, STC and STD executed by the peer devices cA, $cC_1$ and cD. A second chain relates to the subtasks STB, STC and STE, the peer devices cB, $cC_2$ and cE executing the respective subtasks. A linking of the subtasks STF, STB and STG is specified as a third composed service, the peer devices cF, cB and cG executing the respective subtasks. Here, the peer device cB, for example, participates in two different composed services. This is possible for example, if the execution of subtasks for the composed service which consists of a chaining of the services STB, STC and STE does not have to take place simultaneously with the execution of the subtask STB for the chaining of STF, STB and STG.

It is also possible, as demonstrated with regard to the service group SGC, for there to be two executing peer devices $cC_1$ and $cC_2$ in a service group, executing the subtask STC in parallel.

The invention consequently creates an absolutely decentralized and failsafe solution for the provision of composed services of subtasks in a peer-to-peer network. Advantageously, in the composition and provision of the composed service not all the possible chaining paths among all the peer devices of the network are compared in terms of their service and user requirements, but only those peers which can execute a predetermined subtask. This reduces the complexity of initiating the composed service from an at least exponential runtime of an NP complete pathfinding problem merely to a selection problem within the respective service groups. Initiation of the composed service is effected in a distributed and practically failsafe manner.

During execution of the composed service, each subtask is executed at any time by a best possible peer. The requirements for subtask execution can also be flexibly defined for different composed services, changed user requirements and contexts. In this way, when forming a corresponding SubtaskResource, a dynamic selection of the respectively executing peer device can be selected and the respective computational load allocated to the peer devices with the best performance profiles for the respective subtask. During execution of the composed service, each subtask is executed in a failsafe manner, whereby, in the event of a failure of an executing peer device, the respective processing state of the subtask passes with minimal outlay in terms of time to a previously defined peer which had been designated a watchdog peer.

The composed services can also be put together flexibly by specifying the optional subtasks, initiation of the composed service also always having to be carried out successfully if individual optional subtasks are not available. Even in the event of failure of complete optional subtasks, the composed service can still be performed and provided in a rudimentary manner. If after the failure of an entire group of peer devices, a peer device is once again ready to execute the respective subtask, the processing of the optional subtask can take place without re-initiation of the entire composed service.

Although the present invention has been explained in detail with on the basis of preferred exemplary embodiments, it is not restricted thereto, but can be modified in a variety of ways. For example, additional service chainings can be made, which differ from textchat from a PDA. The specified resources may comprise additional information corresponding to the requirements of a composed service. In principle, the inventive method can be executed in peer-to-peer networks of any design. An Internet-based peer-to-peer network is specified only by way of example.

The invention claimed is:

1. A method for providing a service composed of subtasks in a peer-to-peer network, comprising:
    forming a first group by assigning a plurality of first peer devices of the peer-to-peer network to the first group, the first group being defined by a predetermined first subtask, each first peer device assigned to the first group configured to execute the predetermined first subtask;
    forming a second group by assigning a plurality of second peer devices of the network to the second group, the second group being defined by a predetermined second subtask, each second peer device assigned to the second group configured to execute the predetermined second subtask;
    publishing in the peer-to-peer network, by a peer device requesting a composed service, information relating to the requested composed service that identifies a sequence of subtasks to be executed for providing the composed service, the subtasks within the sequence of subtasks comprising the first and second predetermined subtasks such that the first predetermined subtask is to be performed prior to the second predetermined subtask when performing the sequence of subtasks to provide the requested composed service;
    selecting, by the peer device requesting the composed service, a second peer device from the second group, the selected second peer device being selected for executing the second subtask of the sequence of subtasks to provide the composed service;
    selecting, by the selected second peer device, a first peer device from the first group for executing the first subtask of the sequence of subtasks to provide the composed service after the selected second peer device is selected by the peer device requesting the composed service;
    executing the first subtask of the sequence of subtasks by the first peer device to provide the composed service; and
    executing the second subtask of the sequence of subtasks by the selected second peer device after the selected first peer device executes the first subtask to provide the composed service.

2. The method of claim 1, further comprising:
    publishing a CandidateResource by each of the peer devices, the CandidateResource published by each peer device comprising information about subtasks which that peer device is configured to execute and a performance capability of that peer device; and
    publishing a SubtaskResource by the peer device requesting the composed service which comprises information about all the subtasks of the sequence of subtasks to be executed to provide the composed service and specifications for those subtasks.

3. The method of claim 1, further comprising:
    defining a first watchdog peer device from the first group of peer devices; and
    monitoring, by the first watchdog peer device, a function of the selected first peer device executing the first subtask.

4. The method of claim 3, comprising:
    the first watchdog peer device taking over execution of the first subtask when the selected first peer device fails.

5. The method of claim 1, further comprising:
    publishing a ServiceGroupResource for the first group, the ServiceGroupResource comprising information about the first peer devices of the first group.

6. The method of claim 5, wherein the ServiceGroupResource is periodically updated.

7. The method of claim 1, wherein the sequence of subtasks comprises a third subtask and the method further comprising:
    forming a third group by assigning a plurality of third peer devices of the network to the third group, the third group being defined by a predetermined third subtask, each third peer device assigned to the third group configured to execute the predetermined third subtask;
    selecting, by the selected first peer device, a third peer device from the third group for executing the third subtask of the sequence of subtasks to provide the composed service after the selected first peer device is selected by the second peer device; and
    the selected third peer device executing the third subtask to provide the composed service prior to the selected first peer device executing the first subtask.

8. The method of claim 1, wherein a ComposedServiceStateResource is published by the peer device requesting the composed service, the ComposedServiceStateResource comprising information identifying an operating state of the subtasks forming the composed service and/or intermediate results of the subtasks.

9. The method of claim 1, comprising sending a first ring message from the peer device requesting the composed service to the selected first peer device which executes the first subtask first in the sequence of subtasks and the selected first peer device sending a second ring message to the selected second peer device;

wherein the sending of the first and second ring messages are sent in order to instantiate the subtasks of the sequence of subtasks.

10. The method of claim 9, wherein the first and second ring messages are sent at regular intervals to monitor execution of the composed service.

11. The method of claim 1, further comprising:

transmitting ring messages between the peer device requesting the composed service, the selected second peer device, the selected first peer device, and peer devices selected to perform other subtasks of the sequence of subtasks, each of the peer devices performing the subtasks of the sequence of subtasks determining an identification of the peer device which will execute an immediately subsequent subtask in the sequence of subtasks by reading a published Service-GroupResource of the respective group defined by the immediately subsequent subtask.

12. The method of claim 1, wherein the publishing in the peer-to-peer network, by the peer device requesting the composed service, information relating to the requested composed service that identifies the sequence of subtasks to be executed also identifies specifications of the peer devices to execute the subtasks.

13. The method of claim 1, wherein the publishing in the peer-to-peer network, by the peer device requesting the composed service, information relating to the requested composed service that identifies the sequence of subtasks to be executed comprises:

publishing a ComposedServiceResource comprising information about the sequence of the subtasks used for executing the composed service which is a criteria for the selection of executing peer devices that execute the subtasks of the sequence of subtasks, chaining of the subtasks of the sequence of subtasks, and execution parameters for the subtasks of the sequence of subtasks, wherein optional subtasks of the sequence of subtasks that are skippable in the execution of the chaining of the subtasks of the sequence of subtasks are indicated as being optional in the ComposedServiceResource.

14. The method of claim 13, wherein the sequence of subtasks identifies a subtask that is skippable, the method also comprising:

when all peer devices of a group defined by the optional subtask fail, skipping the skippable subtask.

15. The method of claim 1, wherein at least one of the plurality of peer devices is assigned to several different groups defined by different predetermined subtasks.

16. The method of claim 1, wherein the second predetermined subtask is a last subtask of the sequence of subtasks to be performed for providing the composed service.

17. A communication system, comprising:

a plurality of peer devices communicatively connected to each other within a network, the peer devices comprising a first peer device, a second peer device, and a requesting peer device;

the first peer device configured to execute a predetermined first subtask, the second peer device configured to execute a predetermined second subtask;

the requesting peer device configured to request a composed service, the composed service comprising a sequence of subtasks comprising the first and second predetermined subtasks, the second predetermined subtask being a last subtask of the sequence of subtasks, and the first predetermined subtask of the sequence of subtasks being a subtask to be performed before the second predetermined subtask, the requesting peer device configured to request the composed service such that the requesting peer device selects the second peer device to perform the second predetermined subtask at a time the composed service is requested; and the second peer device configured to communicate with the first peer device to select the first peer device to perform the first subtask in response to the second peer device being selected by the requesting peer device to perform the second subtask of the sequence of subtasks.

18. The system of claim 17, wherein the first peer device is configured to execute the first predetermined subtask to provide the composed service to the requesting peer device prior to the second peer device executing the second predetermined subtask to provide the composed service to the requesting peer device.

19. The system of claim 18, wherein the requesting peer device is configured to send a first ring message to a peer device of the plurality of peer devices to perform a starting subtask of the sequence of subtasks and the first peer device is configured to send a second ring message to the second peer device to instantiate the subtasks of the sequence of subtasks.

20. The system of claim 17, further comprising a first watchdog peer device configured to monitor a function of the first peer device when the first peer device executes the first subtask of the sequence of subtasks; and wherein:

the sequence of subtasks comprises a third subtask that is to be executed prior to the first subtask and also prior to the second subtask;

the plurality of peer devices also comprises a third peer device configured to execute the third subtask of the sequence of subtasks; and the first peer device is configured to communicate with the third peer device to select the third peer device to perform the third subtask of the sequence of subtasks in response to the first peer device being selected to perform the first subtask of the sequence of subtasks by the second peer device.

* * * * *